(12) United States Patent
Rakhra et al.

(10) Patent No.: US 11,765,553 B2
(45) Date of Patent: Sep. 19, 2023

(54) SYSTEM AND METHOD TO DETERMINE REAL-TIME LOCATION OF A USER BASED ON PHYSICAL LOCATION OF A USER DEVICE

(71) Applicant: GLOBALTECHAPP LLC, Bradenton, FL (US)

(72) Inventors: Diljinderjit Singh Rakhra, Stratham, NH (US); Enver Turan Akin, Bradenton, FL (US)

(73) Assignee: GLOBALTECHAPP LLC, Bradenton, FL (US)

( * ) Notice: Subject to any disclaimer, the term of this patent is extended or adjusted under 35 U.S.C. 154(b) by 28 days.

(21) Appl. No.: 17/674,851

(22) Filed: Feb. 18, 2022

(65) Prior Publication Data
US 2023/0269557 A1   Aug. 24, 2023

(51) Int. Cl.
H04W 4/029   (2018.01)
G01S 5/00   (2006.01)
H04W 4/021   (2018.01)

(52) U.S. Cl.
CPC .......... *H04W 4/029* (2018.02); *G01S 5/0027* (2013.01); *H04W 4/021* (2013.01)

(58) Field of Classification Search
CPC ... H04W 4/029; H04W 4/021; H04W 64/003; H04W 84/12; H04W 48/04; H04W 64/00; G01S 5/0027; H04B 7/0413; H04B 7/0417; H04B 7/0608
See application file for complete search history.

(56) References Cited

U.S. PATENT DOCUMENTS

| | | | | |
|---|---|---|---|---|
| 2009/0237689 A1* | 9/2009 | Tokunaga | ........... | H04N 1/4015 358/1.9 |
| 2014/0327580 A1* | 11/2014 | Rautiainen | ................ | G01S 5/08 342/385 |
| 2015/0181405 A1* | 6/2015 | Dua | ...................... | H04W 8/005 455/456.3 |

* cited by examiner

*Primary Examiner* — Fred A Casca
(74) *Attorney, Agent, or Firm* — Jose Cherson Weissbrot (57) ABSTRACT

Systems and methods are described for determining and verifying real-time location of a user based on physical location of a user device. The user device receives a generated geo-referenced position data from a server and correlates the geo-referenced position data with a ground-truth information to determine physical location of the user. The user device selects a set of test points using interpolation of a desired path of the user, where the desired path is determined based on the physical location of the user. The user device displays the set of test points on the desired path on a display unit and initiates a test call through a mobile network at each test point of the set of test points to verify the physical location of the user.

10 Claims, 7 Drawing Sheets

SYSTEM AND METHOD TO DETERMINE REAL-TIME LOCATION OF A USER BASED ON PHYSICAL LOCATION OF A USER DEVICE

TECHNICAL FIELD

The present disclosure relates to the field of location determination systems. In particular, the present disclosure provides systems and methods for determining real-time location of a user based on physical location of a user device.

BACKGROUND

In the era of digitization, various forms of warning and control systems and methods have been developed over the years for use and/or control in numerous environments. Location based services are also rapidly expanding, where outdoor location technologies are mainly based on the Global Positioning System (GPS) technologies. The GPS is a satellite-based navigation and time transfer system developed by the U.S. Department of Defence. GPS serves marine, airborne and terrestrial users, military and civilian and the likes.

However, GPS technology becomes inadequate in performance for indoor locations. Moreover, the fact that uninterrupted satellite reception is not possible in many locations is a major limitation of GPS based systems. Densely populated areas and radio-frequency-signal shadowed locations, such as urban centers, generally do not allow proper operation of GPS, yet it is in these locations that the need for emergency rescue systems is greatest. Another important consideration is that GPS itself is susceptible to jamming and other man-made interference.

Therefore, there is a need in the art for a cost effective location determination services that maintain performance in any location including indoors, in urban canyons and city centers.

Objects of the Present Disclosure

It is a general object of the present disclosure to provide systems and methods for determining location of a user based on physical location of a user device.

It is another object of the present disclosure to provide systems and methods for determining location of a user to facilitate rescue during emergency conditions.

It is another object of the present disclosure to provide systems and methods for determining location of user a without using GPS.

It is another object of the present disclosure to provide systems and methods for determining location of user using mobile/cellular network.

It is yet another object of the present disclosure to provide systems and methods for determining of user that maintains performance in any location including indoors, in urban canyons and city centers.

SUMMARY

Systems and methods are described for determining and verifying location of a user based on physical location of a user device. An aspect of the present disclosure pertains to a method to determine and verify real-time location of a user based on physical location of a user device, the method comprising receiving, by one or more processors of the user device, a generated geo-referenced position data from a server and correlating the geo-referenced position data with a ground-truth information to determine physical location of the user; selecting, by the one or more processors, a set of test points using linear interpolation of desired path of the user, wherein the desired path is determined based on the physical location of the user; displaying, by the one or more processors, the set of test points on the desired path on a display unit of the user device; and initiating, by the one or more processors, a test call through a mobile network at each test point of the set of test points to verify the physical location of the user.

According to an embodiment, the user device is communicatively coupled with the server.

According to an embodiment, the user device is communicatively coupled with a mobile device controller.

According to an embodiment, the user device continuously monitors and displays path of the user in real-time.

According to an embodiment, the selected set of test points are notified to the mobile device controller.

According to an embodiment, the mobile device controller triggers the user device to initiate the test call through the mobile network at each test point of the set of test points.

According to an embodiment, the user device transmits test information at each test point of the set of test points to the server.

According to an embodiment, the server performs statistical analysis of the test information.

Another aspect of the present disclosure relates to a system implemented in a user device to determine and verify real-time location of a user based on physical location of the user device, the system comprising a processor coupled with a memory, the memory storing instructions executable by the processor to: receive a generated geo-referenced position data from a server and correlating the geo-referenced position data with a ground-truth information to determine physical location of the user; select a set of test points using linear interpolation of a desired path of the user, wherein the desired path is determined based on the physical location of the user; display the set of test points on the desired path on a display unit of the user device; and initiate a test call through a mobile network at each test point of the set of test points to verify the physical location of the user.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Systems and methods are described for determining location of a user based on physical location of a user device. An aspect of the present disclosure pertains to a method to determine and verify physical location of a user based on physical location of a user device, the method comprising receiving, by one or more processors of the user device, a generated geo-referenced position data from a server and correlating the geo-referenced position data with a ground-truth information to determine physical location of the user; selecting, by the one or more processors, a set of test points using linear interpolation of a desired path of the user, wherein the desired path is determined based on the physical location of the user; displaying, by the one or more processors, the set of test points on the desired path on a display unit of the user device; and initiating, by the one or more processors, a test call through a mobile network at each test point of the set of test points to verify the physical location of the user.

According to an embodiment, the user device is communicatively coupled with the server.

According to an embodiment, the user device is communicatively coupled with a mobile device controller.

According to an embodiment, the user device continuously monitors and displays path of the user in real-time.

According to an embodiment, the selected set of test points are notified to the mobile device controller.

According to an embodiment, the mobile device controller triggers the user device to initiate the test call through the mobile network at each test point of the set of test points.

According to an embodiment, the user device transmits test information at each test point of the set of test points to the server.

According to an embodiment, the server performs statistical analysis of the test information.

Another aspect of the present disclosure relates to a system implemented in a user device to determine and verify location of a user based on physical location of the user device, the system comprising a processor coupled with a memory, the memory storing instructions executable by the processor to: receive a generated geo-referenced position data from a server and correlating the geo-referenced position data with a ground-truth information to determine physical location of the user; select a set of test points using linear interpolation of a desired path of the user, wherein the desired path is determined based on the physical location of the user; display the set of test points on the desired path on a display unit of the user device; and initiate a test call through a mobile network at each test point of the set of test points to verify the physical location of the user.

Various embodiments of the present disclosure are designed to collect data to capture true indoor or outdoor physical location of a user with high accuracy, either at stationary points or in-motion with or without GPS. The user device transmits call time and position data to a server implemented in a data processing center that obtains fix data and performs a statistical analysis to calculate the network accuracy and confidence level. Those skilled with the art would appreciate that embodiments of the present disclosure can be implemented and used with minimal human interface with Internet of Things (IoT) devices, artificial intelligence and robotics applications.

Figure 1A:
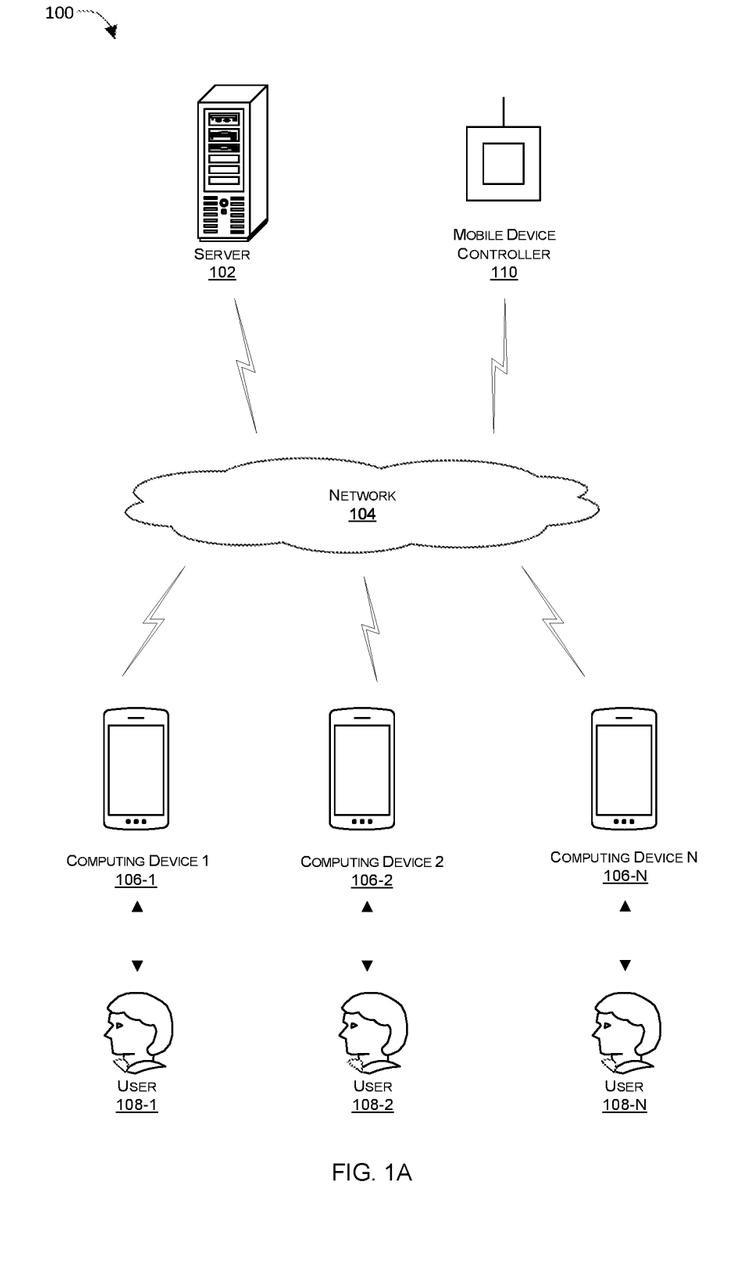
FIG. 1A illustrates an exemplary network architecture in which or with which proposed system can be implemented in accordance with an embodiment of the present disclosure.

FIG. 1A illustrates an exemplary network architecture 100 in which or with which proposed system can be implemented in accordance with an embodiment of the present disclosure.

According to an embodiment of the present disclosure, in a network implementation, a system can be implemented in each of a plurality of computing devices 106-1, 106-2 . . . 106-N (collectively referred to as computing devices 106 or user devices 106 and individually referred to as computing device 106 or user device 106 hereinafter). Further, the system can interact with users 108-1, 108-2 . . . 108-N (collectively referred to as users 108, and individually referred to as user 108 hereinafter), through the user devices 106 or through applications residing on the user devices 106. A server 102 and mobile device controller 110 is communicative coupled with the user devices 106 through a network 104. The system can be implemented using any or a combination of hardware components and software components of a user device, such that embodiments of the present disclosure can facilitate determination of real-time location of a user based on physical location of a user device.

In an implementation, the system can be accessed by the user 108 through applications residing on any operating system, including but not limited to, Android™, iOS™, and the like. Examples of the user devices 106 can include, but are not limited to, a portable computer, a personal digital assistant, a handheld device, and a workstation. In a preferred embodiment, the user devices 106 are mobile phones of the respective users 108.

The network 104 can be a wireless network, a wired network or a combination thereof that can be implemented as one of the different types of networks, such as a cellular network or mobile network, Intranet, Local Area Network (LAN), Wide Area Network (WAN), Internet, and the like.

In an embodiment, the system can enable registration of the user. The registration can be based on details such as name, address, e-mail address, phone number, and the like. Also, the system can utilize any unique identifier, provided by the user, to verify the authenticity of the user.

In an embodiment the system implemented in the user device 106 is an automated system to collect position data within an environment where reliable GPS data might not be available. The system is implemented on a mobile platform designed to provide odometry information under sub-meter accuracy indoors using proprietary software and firmware. The system can interpolate and collect position with high accuracy, either at stationary points or in-motion transmit call time and position to the server 102 implemented in the data to processing center. The system is synchronized with user device 106 works in synchronization with the components of mobile device controller 110 and also, communicates information with the server 102.

According to an embodiment, the system implemented in the user device 106 can receive a generated geo-referenced position data from a server and correlates the geo-referenced position data with a ground-truth information to determine physical location of the user. The system captures a set of test points based on a desired path of the user and displays the set of test points on the recue path on a display unit (e.g. display screen) of the user device. The system then initiates a test call through a mobile network at each test point of the set of test points to verify physical location of the user. The user device 106 continuously monitors and displays path of the user in real-time.

Those skilled in the art would appreciate that the system captures the test points in real-time and possesses capabilities of displaying floor plans, indoor geo-referenced background images and visualization of predefined test points on a desired path. The system captures reference time data including arrival, departure, stoppage, and intervals, electronically and archive all the data that would be sufficient to reconstruct ground truth and the set of test points. The system linearly interpolate between the test points to produce a truth position for any time of applicability during the route. The system also monitors and allows pausing of the user 108 at will along the path and report the ground truth at that test point where the user is paused. The system incorporates a mechanism for the user device 106 to synchronize with high accuracy to Coordinated Universal Time (UTC) time and provides textual and graphical feedback to the user 108, while the system automatically transmits data automatically to the server 102.

According to an embodiment, the system can notify the selected set of test points the mobile device controller 110. The mobile device controller can trigger the user device 106 to initiate the test call through the mobile network at each test point of the set of test points. Therefore, the system interacts with the mobile device controller 110, which triggers the user device 106 to place test calls. The user devices 106 can be placed to accommodate the approaches in Standards Bodies' documents including test point spacing and orientation randomization. The mobile device controller 110 can automatically initiate set of test calls on multiple user devices 106, which can be customized based on call duration and trigger time. In an example, call setup time and time needed to complete any processing and be ready to move to the next test point can be less than 30 seconds. The mobile device controller 110 can customize time or distance-based call triggers on multiple user devices 106 simultaneously or sequentially.

According to an embodiment, the system transmits test information at each test point of the set of test points to the server 102, which performs statistical analysis of the test information. The server 102 can provide functionalities of data processing, statistical analysis, reporting, archiving, and the likes. The server 102 can provide digitized floor plans (e.g. paper, light amplification by stimulated emission of radiation (LASER), Light Detection and Ranging (LIDAR) generated). Document and store the test point determination methodology including using random number generator for static testing, desired path determination methodology for dynamic testing. Fix data can be used to verify the performance of the network with reference to location accuracy. Further, the server can obtain fix data from including LMF, PDE, SLMC. The server can use current position location to guide the user 108 to the desired location with high accuracy by extracting the test points and comparing test point data to ground truth measured at test locations to the fix data. The server 102 can also perform statistical analysis to satisfy Standards Bodies' regulations and produce a report for Location Accuracy Certification (LAC).

Figure 1B:
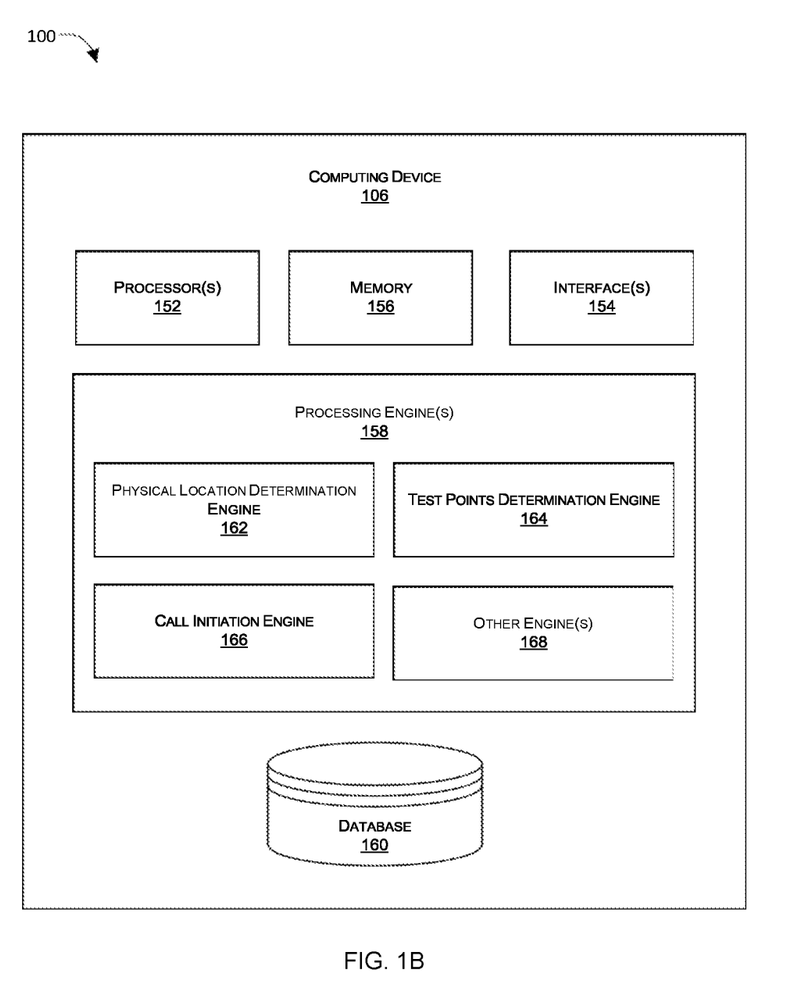
FIG. 1B illustrates exemplary functional components of a computing device in accordance with an embodiment of the present disclosure.

FIG. 1B illustrates exemplary functional components of a computing device 106 in accordance with an embodiment of the present disclosure.

In an aspect, the computing device 106 may comprise one or more processor(s) 152. The one or more processor(s) 152 may be implemented as one or more microprocessors, microcomputers, microcontrollers, digital signal processors, central processing units, logic circuitries, and/or any devices that manipulate data based on operational instructions. Among other capabilities, the one or more processor(s) 152 are configured to fetch and execute computer-readable instructions saved in a memory 156 of the computing device 106. The memory 156 may store one or more computer-readable instructions or routines, which may be fetched and executed to create or share the data units over a network service. The memory 156 may comprise any non-transitory storage device including, for example, volatile memory such as RAM, or non-volatile memory such as EPROM, flash memory, and the like.

The computing device 106 may also comprise an interface(s) 154. The interface(s) 154 may comprise a variety of interfaces, for example, interfaces for data input and output devices, referred to as I/O devices, storage devices, and the like. The interface(s) 154 may facilitate communication of computing device 106 with various devices coupled to the computing device 106 such as the server 102 and the mobile device controller 110. The interface(s) 154 may also provide a communication pathway for one or more components of the computing device 106. Examples of such components include, but are not limited to, processing engine(s) 158 and data 160.

The processing engine(s) 158 may be implemented as a combination of hardware and programming (for example, programmable instructions) to implement one or more functionalities of the processing engine(s) 158. In examples described herein, such combinations of hardware and programming may be implemented in several different ways. For example, the programming for the processing engine(s) 158 may be processor executable instructions saved on a non-transitory machine-readable storage medium and the hardware for the processing engine(s) 158 may comprise a processing resource (for example, one or more processors), to execute such instructions. In the present examples, the machine-readable storage medium may store instructions that, when executed by the processing resource, implement the processing engine(s) 158. In such examples, the computing device 106 may comprise the machine-readable storage medium storing the instructions and the processing resource to execute the instructions, or the machine-readable storage medium may be separate but accessible to the computing device 106 and the processing resource. In other examples, the processing engine(s) 158 may be implemented by electronic circuitry.

The database 210 may comprise data that is either saved or generated as a result of functionalities implemented by any of the components of the processing engine(s) 158.

In an exemplary embodiment, the processing engine(s) 158 may comprise a physical location determination engine 162, test points determination engine 164, a call initiation engine 166, and other engine(s) 168. It would be appreciated that engines being described are only exemplary engines and any other engines or sub-engines may be included as part of the computing device 106. These engines too may be merged or divided into super-engines or sub-engines as may be configured.

According to an embodiment, the physical location determination engine 162 can receive a generated geo-referenced position data from a server and correlate the geo-referenced position data with a ground-truth information to determine physical location of the user. The test points determination engine 164 can select a set of test points based on using linear interpolation of desired path of the user. The desired path can be determined based on the physical location of the user. The test points determination engine 164 can then display the set of test points on the desired path on a display unit of the computing device 106. The call initiation engine 166 can initiate a test call through a mobile network at each test point of the set of test points to verify the physical location of the user.

Figure 2A:
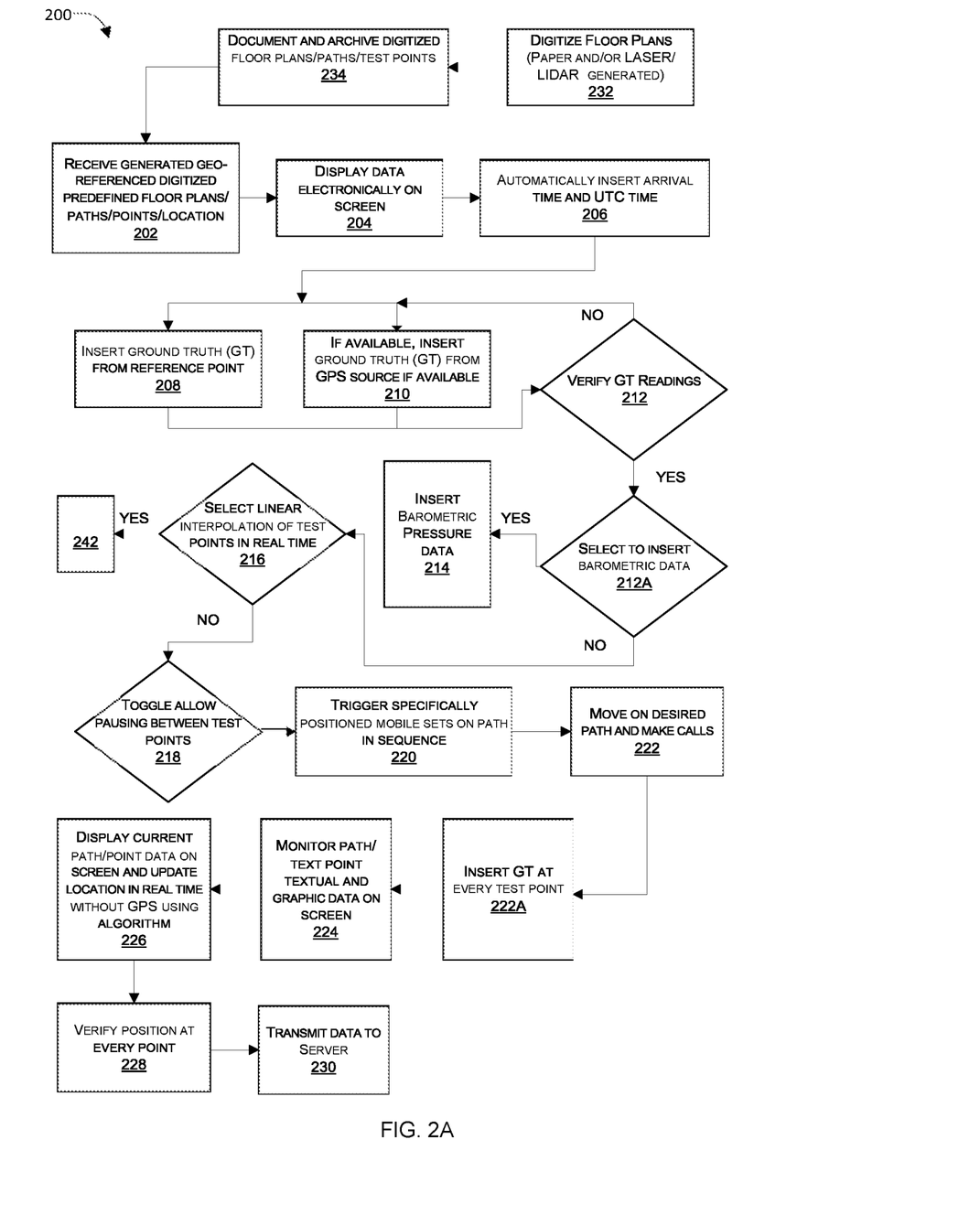
FIG. 2A is a flow diagram illustrating a process performed at a user device in accordance with an embodiment of the present disclosure.

FIG. 2A is a flow diagram 200 illustrating a process performed at a user device in accordance with an embodiment of the present disclosure.

In an embodiment, the process for facilitating determining and verifying real-time location of a user based on physical location of the user device can be initiated at block 202, which pertains to receiving generated geo-referenced digitized pre-defined floorplan, path, points, or location data from a server. Those skilled in the art would appreciate that the server (at block 232) can generate digitized paper, LASER or LIDAR based floor plans and can (at block 234) document and archive digitized pre-defined floor plans, paths or test points to send the data user device to determine the test paths. At block 204, the data can be displayed electronically on display screen of the user device. At block 206, the user device can insert arrival time on the user at a point and UTC time. At block 208, the user device can insert ground truth from a reference point and if available, at block 210, the user device can insert ground truth from a GPS source. At block 212, the user device verifies whether the ground truth readings are within a pre-defined range such that if the verification is unsuccessful, the user device can insert ground truth in accordance with 208 and 210. At block 212A, the user can select whether to insert barometric data and accordingly at block 214, the user device can insert barometric pressure data, which can be used to determine height (z-axis) of location of the user. At block 216, the user selects linear interpolation of test points in real time and transmits the test point data to mobile device controller (at block 242, described in accordance with FIG. 2B). If an alternate method is selected, at block 218, the user device allows pausing between the test points. At block 220, the specifically positioned user device can receive a set of triggers in sequence. At block 222, the user can then move on desired path such that the user device makes a call at each test point. At block 222A, the user device can insert the ground truth data at every test point. As the user moves on a desired path, at block 224, the user device monitors the test points on the path using textual and graphical data. At block 226, the user device displays current path/test point data on screen and update location in real-time without GPS. At block 228, the user device verifies the position an each test point and at block 230, the user device transmits the information to the server.

Figure 2B:
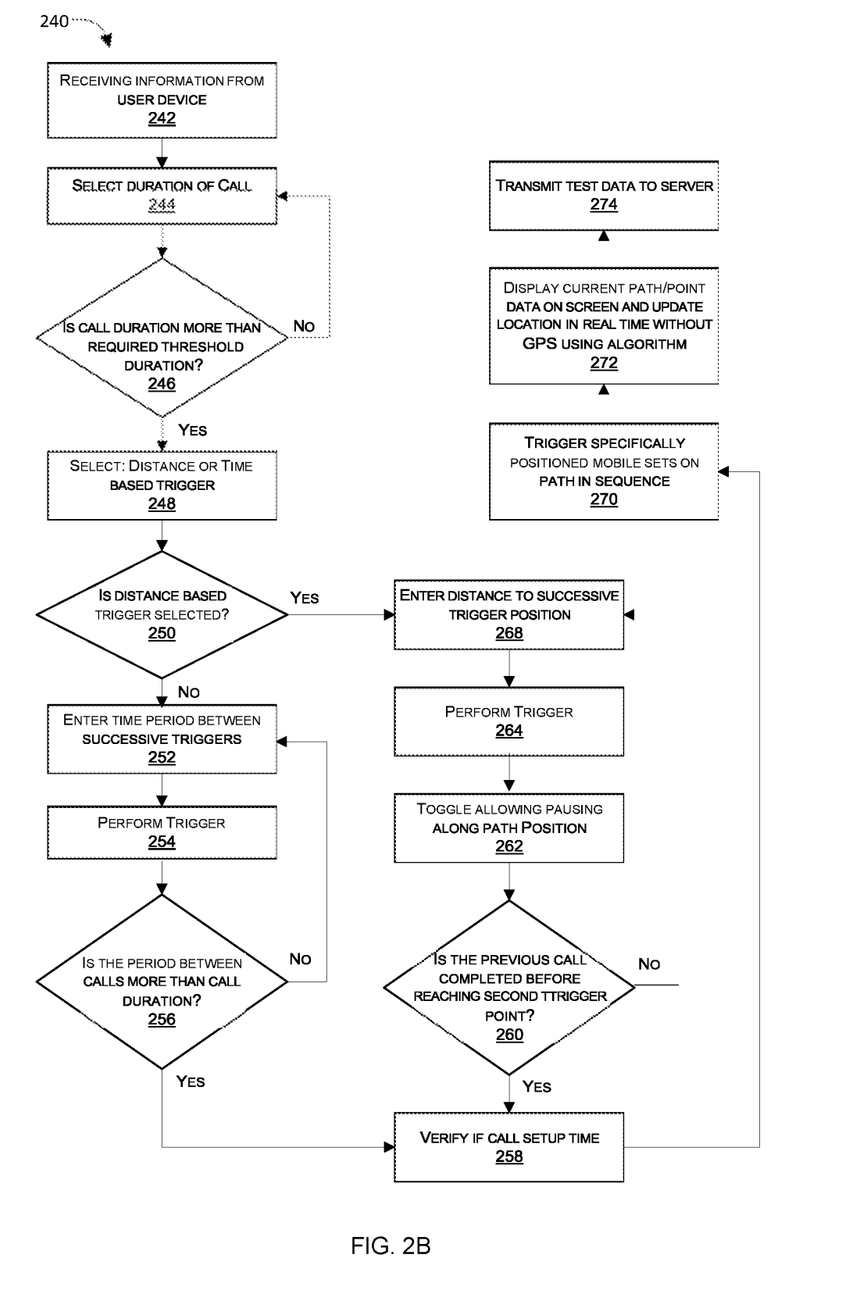
FIG. 2B is a flow diagram illustrating a process performed at a mobile device controller in accordance with an embodiment of the present disclosure.

FIG. 2B is a flow diagram 240 illustrating a process performed at a mobile device controller in accordance with an embodiment of the present disclosure.

According to an embodiment, at block 242, the mobile device controller can receive information including linear interpolation of test points, from the user device (from block 216). At block 244, the mobile device controller can select duration of call that needs to be made at each test point. At block 246, the mobile device controller checks whether the call duration is more than a required threshold such that if the call duration is greater than a threshold, the mobile device controller, at block 248, elects distance or time based trigger and values. At block 248, the mobile device controller can check if the distance based trigger is selected such that if the distance based trigger is selected, at block 268, the mobile device controller can provide distance value between successive trigger position. At block 264, the mobile device controller can accordingly perform the trigger. At 262, the mobile device controller allows pausing along the path position. In case, at block 250, the distance based trigger is not selected, at block 252, the mobile device controller provides time-period between the successive periods and at block 254, the mobile device controller accordingly performs the triggers. At blocks 256 and 260, the mobile device controller checks is the period between the calls is more than the call duration or is the previous call completed before reaching the second point. If the period between the calls is more than the call duration or if the previous call is completed before reaching the second point, at block 258, the mobile device controller can verify call setup time in within desires parameter. At block 270, the mobile device controller can trigger the specifically positioned mobile device on the desired path in sequence. At block 272, the mobile device controller can display current path or test point data on screen and update location in real time with using GPS. At block 274, the mobile device controller can transmit the test data to a server.

Figure 2C:
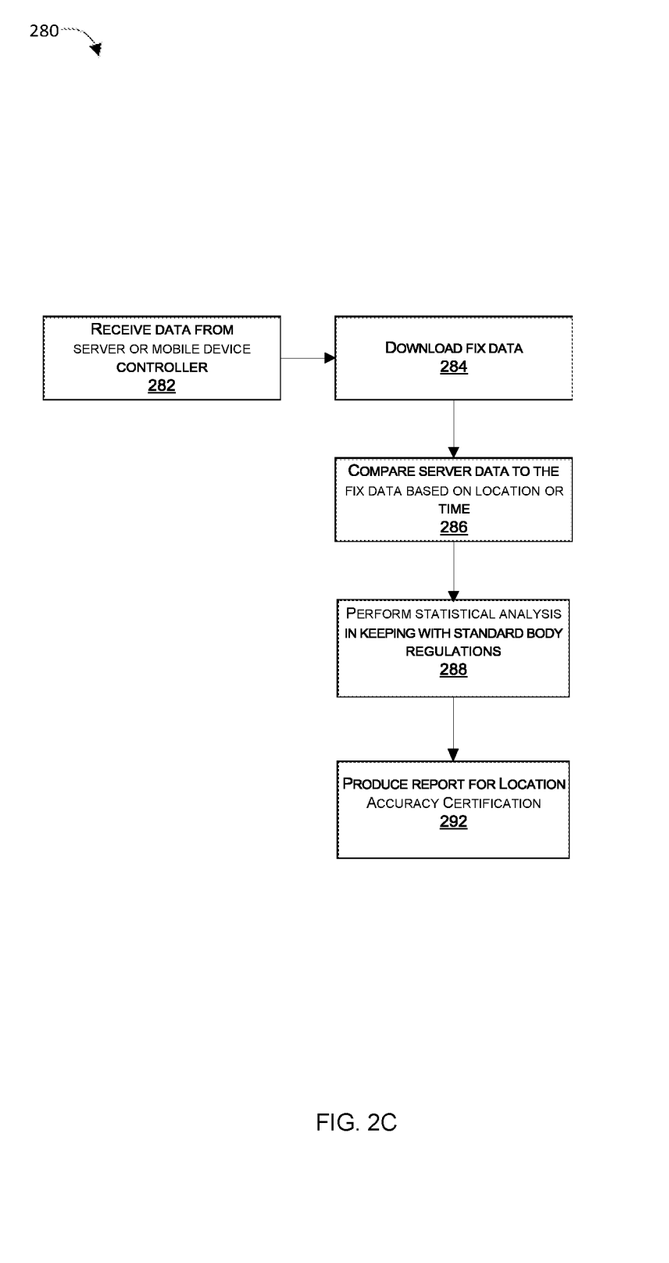
FIG. 2C is a flow diagram illustrating a process performed at a server in accordance with an embodiment of the present disclosure.

FIG. 2C is a flow diagram 280 illustrating a process performed at a server in accordance with an embodiment of the present disclosure.

According to an embodiment, the server performs data processing, statistical analysis, reporting and archiving. At block 282, the server can receive data from the user device (from block 230) or the mobile device controller (from block 274). At block 284, the server downloads fix data from the user device or the mobile device controller. At block 286, the sever compares fix data with server data based on location or time. At block 288, the server performs statistical analysis in keeping with Standard Bodies' regulations so that at block 290, the server can produce a report for Location Accuracy Certification.

Figure 3:
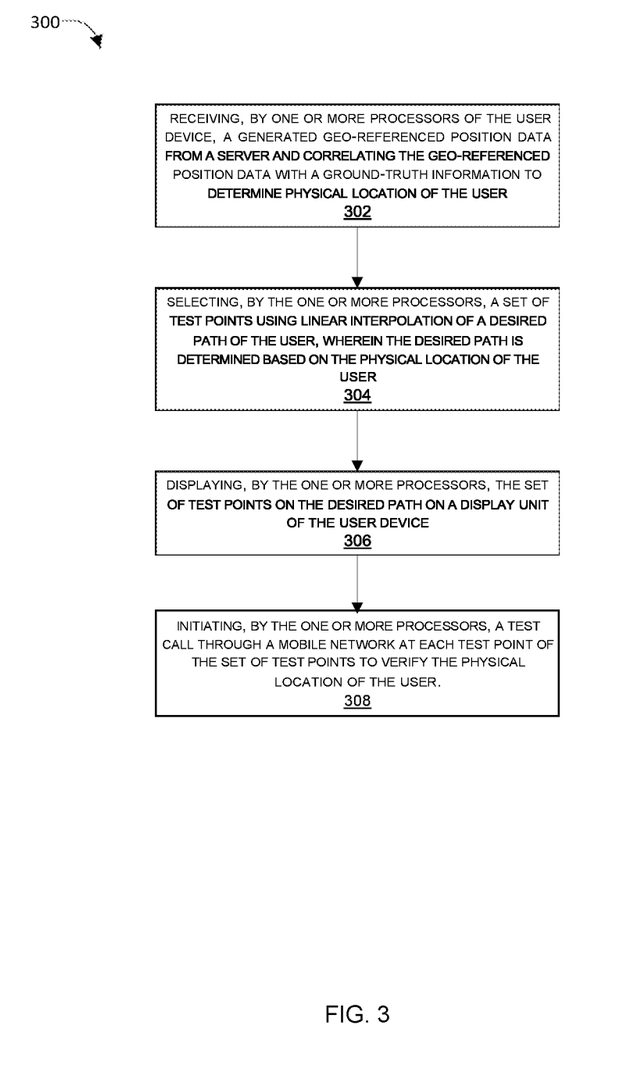
FIG. 3 is a flow diagram illustrating exemplary working of the system in accordance with an embodiment of the present disclosure.

FIG. 3 is a flow diagram 300 illustrating exemplary working of the system in accordance with an embodiment of the present disclosure.

Referring exemplary flow diagram 300, the process can be initiated at block 302, where one or more processors of the user device can receive a generated geo-referenced position data from a server and correlate the geo-referenced position data with a ground-truth information to determine physical location of the user. At block 304, user device can select a set of test points using linear interpolation of desired path of the user, where the desired path is determined based on the physical location of the user. At block 306, the user device can display the set of test points on the desired path on a display unit of the user device and at block 308, the user device can initiate a test call through a mobile network at each test point of the set of test points to verify the physical location of the user.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 4:
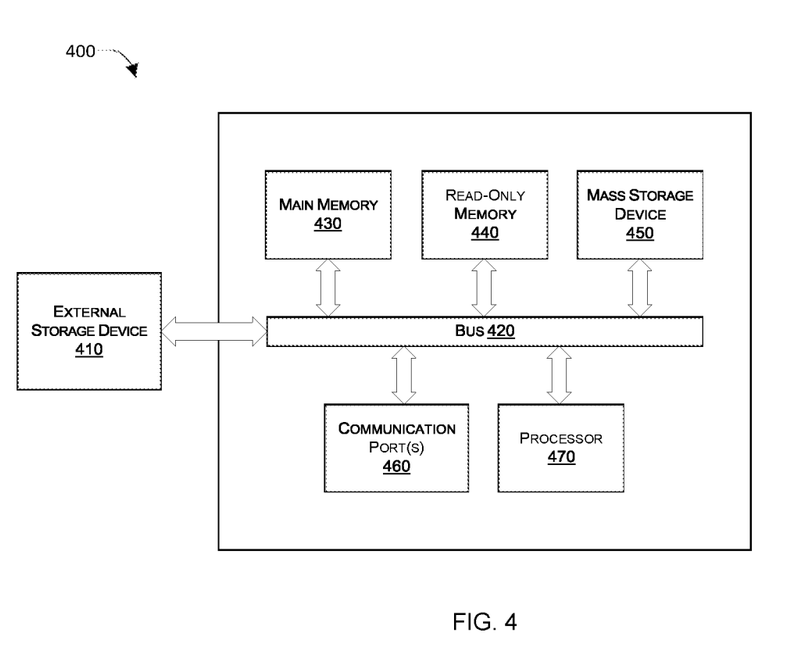
FIG. 4 illustrates an exemplary computer system in which or with which embodiments of the present invention can be utilized in accordance with embodiments of the present disclosure.

FIG. 4 illustrates an exemplary computer system 400 in which or with which embodiments of the present invention can be utilized in accordance with embodiments of the present disclosure.

As shown in FIG. 4, computer system (implemented as a user device, server or mobile device controller) includes an external storage device 410, a bus 420, a main memory 430, a read only memory 440, a mass storage device 450, communication port 460, and a processor 470. A person skilled in the art will appreciate that computer system may include more than one processor and communication ports. Examples of processor 470 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 470 may include various modules associated with embodiments of the present invention. Communication port 460 can be any of an RS-232 port for use with a modem based dialup connection, a 10/100 Ethernet port, a Gigabit or 10 Gigabit port using copper or fiber, a serial port, a parallel port, or other existing or future ports. Communication port 460 may be chosen depending on a network, such a Local Area Network (LAN), Wide Area Network (WAN), or any network to which computer system connects.

Memory 430 can be Random Access Memory (RAM), or any other dynamic storage device commonly known in the art. Read only memory 440 can be any static storage device(s) e.g., but not limited to, a Programmable Read Only Memory (PROM) chips for storing static information e.g., start-up or BIOS instructions for processor 470. Mass storage 450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 420 communicatively couples processor(s) 470 with the other memory, storage and communication blocks. Bus 420 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 470 to software system.

Optionally, operator and administrative interfaces, e.g. a display, keyboard, and a cursor control device, may also be coupled to bus 420 to support direct operator interaction with computer system. Other operator and administrative interfaces can be provided through network connections connected through communication port 460. External storage device 410 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT DISCLOSURE

The present disclosure provides systems and methods for determining location of a user based on physical location of a user device.

The present disclosure provides systems and methods for determining location of a user.

The present disclosure provides systems and methods for determining location of user a without using GPS.

The present disclosure provides systems and methods for determining location of user using mobile/cellular network.

The present disclosure provides systems and methods for determining location of user that maintains performance in any location including indoors, in urban canyons and city centers.

We claim:

1. A method to determine and verify real-time location of a user based on physical location of a user device; said method comprising:
    receiving, by one or more processors, a generated geo-referenced position data from a server and correlating the geo-referenced position data with a ground-truth information to determine physical location of the user;
    selecting, by the one or more processors, a set of test points using linear interpolation of a desired path of the user, wherein the desired path is determined based on the physical location of the user;
    displaying, by the one or more processors, the set of test points on the desired path on a display unit of the user device; and
    initiating, by the one or more processors, a test call through a mobile network at each test point of the set of test points to verify the physical location of the user.

2. The method of claim 1, wherein the user device is communicatively coupled with the server.

3. The method of claim 1, wherein the user device is communicatively coupled with a mobile device controller.

4. The method of claim 1, wherein the user device continuously monitors and displays path of the user in real-time.

5. The method of claim 1, wherein the selected set of test points are notified to the mobile device controller.

6. The method of claim 5, wherein the mobile device controller triggers the user device to initiate the test call through the mobile network at each test point from the set of test points.

7. The method of claim 1, wherein the user device transmits test information at each test point of the set of test points to the server.

8. The method of claim 7, wherein the server performs statistical analysis of the test information.

9. A system implemented in a user device to determine and verify real-time location of a user based on physical location of the user device, said system comprising a processor coupled with a memory, the memory storing instructions executable by the processor to:

receive a generated geo-referenced position data from a server and correlate the geo-referenced position data with a ground-truth information to determine physical location of the user;

select a set of test points using linear interpolation of a desired path of the user, wherein the desired path is determined based on the physical location of the user;

display the set of test points on the desired path on a display unit of the user device; and initiate a test call through a mobile network at each test point of the set of test points to verify the physical location of the user.

10. The system of claim 9, wherein the selected set of test points are notified to the 25 mobile device controller and wherein the mobile device controller triggers the user device to initiate the test call through the mobile network at each test point from the set of test points.

* * * * *